Dec. 5, 1961 J. M. N. HANLET 3,012,107

SOUND POWERED TELEPHONES

Filed March 11, 1958

INVENTOR
JAQUES MARIE N. HANLET
BY
ATTORNEY

United States Patent Office 3,012,107

Patented Dec. 5, 1961

3,012,107

SOUND POWERED TELEPHONES

Jacques Marie Nöel Hanlet, Paris, France, assignor to Societe d'Electronique et d'Automatisme, Courbevoie, France Filed Mar. 11, 1958, Ser. No. 720,708
Claims priority, application France Mar. 15, 1957
13 Claims. (Cl. 179—115.5)

The present invention concerns improvements in or relating to sound-powered telephone devices.

An object of the invention is to provide a high efficiency electromagnetic driver for use in sound-powered telephone transmitters as well as receivers.

Hitherto, a sound-powered telephone drive arrangement included mainly two pairs of magnetic pole pieces defining separate air-gaps, an oscillating armature with ends extending into these air-gaps, and a pick-up or energizing winding, as the case may be, for a telephone transmitter or receiver, cooperating with the oscillating armature, and frequently provided in two equal coils surrounding corresponding portions of the armature on oposite sides of its oscillating axis. The axis of the armature was linked to an acoustical diaphragm for sound reception in telephone transmitters and for sound reproduction in telephone receivers. When such a known arrangement is to be formed at reduced dimensions, it is difficult to maintain suitable power efficiency with reduced areas of useful air-gap and armature sections, and further it is difficult to maintain a suitable impedance matching between the winding and the lead circuit of the device.

A further object of the invention is to provide for sound-powered telephone transmitters and receivers an electromagnetic driver arrangement which substantially eliminates such difficulties when it is desired to substantially reduce the dimensions and overall volume of such transmitters and receivers.

An electromagnetic device for sound-powered telephones according to the invention is mainly characterized by the combination of at least one flat spiral winding and one pair of magnetic pole-pieces having identical magnetization faces defining an air-gap, and means for so flexibly supporting the spiral winding that it may vibrate within the air-gap opposite sides of a mid-position plane in a location where the lines of force of the magnetic field created by the pole-pieces are substantially parallel to that mid-position plane.

In one form of the invention, the pole pieces facing each other belong to separate cylindrical magnets and the spiral winding is supported within the air-gap therebetween. The spiral winding is formed on a dielectric flexible membrane of substantial annular area surrounding the air-gap so that it may serve as an acoustical diaphragm in the operation of the device. In case, however, a mere reduced diameter is required, the annular area may be restricted and a separate acoustical diaphragm is used rigidly linked to the supporting membrane at its center points. The linking stub may pass through a central duct in one of the cylindrical magnets.

Such a flat spiral winding may be made so as to present a very low impedance which enhances efficiency. However, such impedance may not match the external lead impedance of the utilization circuit of the device. In this respect, the invention further provides means for incorporating in the structure, when required, an impedance matching transformer having an annular core upon which at least one winding is coiled partially in series connection with the spiral winding, and this coil-bearing core is arranged coaxially with the membrane and on one side thereof so as to reduce the useful space of the device. From the electrical point of view, this transformer may either constitute an actual electrical transformer, with separate primary and secondary windings, or a mere auto-transformer with part of its winding acting as a primary as seen from the spiral winding of the device.

In another form of the invention, the permanent magnets themselves have the shape of annular or toroidal cores, magnetized along the axis of rotation, so that the air-gap is annular and the flat spiral winding is supported within the cylindrical space inside the core assembly. In such an arrangement, the whole area of the membrane is acoustically useful. The matching transformer winding or windings may further be coiled around one of the toroidal magnets as the permanent magnet field and the sound-powered field will not interfere, being orthogonal to each other and, in any case, the field intensity of the permanent magnets is of substantially higher value than the variable sound-powered field.

These and other objects of the invention will be more fully apparent from the accompanying drawings, wherein.

Figure 6:
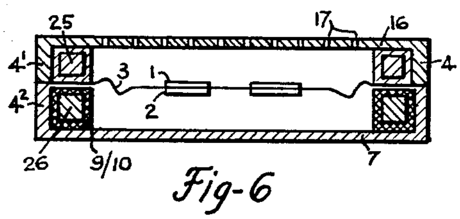
Figure 7:
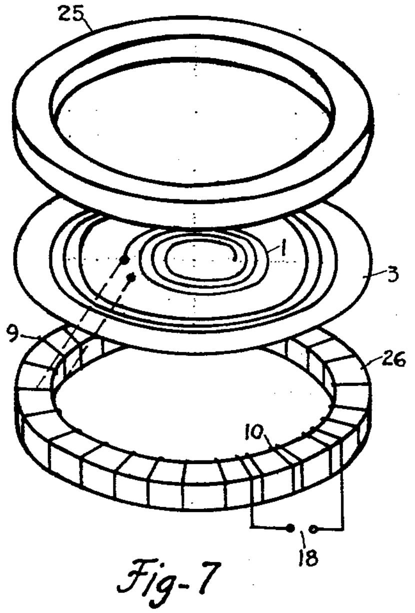
Figure 8:
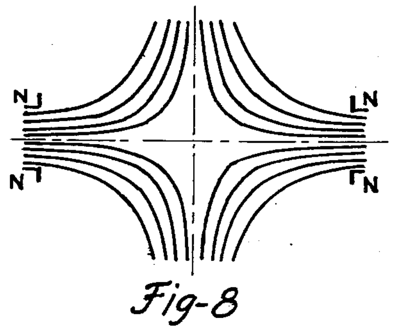

FIGS. 6 and 7, in side cross-sectional and partially exploded views, respectively, show another form of executing the invention; and FIG. 8 illustrates graphically the lines of force of the permanent magnetic field in this second arrangement.

The moving flat spiral winding of these devices is shown to be formed by two spiral coils 1 and 2 on opposite sides of a sheet of flexible dielectric material 3 of plastic material such as known under the commercial name of "Mylar." This material may be brought to temperatures as high as 125° C. without its mechanical properties being damaged. Sheet 3 is circular and its periphery is rigidly clamped in frame 4 (FIG. 1), viz. a pair of flanges $4^1$ and $4^2$ forming a casing (FIGS. 4 and 6).

Sheet 3 may be very thin, for instance about one-half of a millimeter, and the spiral windings 1 and 2 may be formed thereon in known manner, for instance as follows: A layer of about the order of one hundred microns of thickness is formed by evaporating copper or other conducting metallic material on both faces at layer 3 and at least over the central areas of these faces. Conducting strips may be made forming connections between the central coating and the edges of sheet 3. A photographic emulsion is coated over the faces of sheet 3 and exposed to prints of spiral coils. The prints are such as to produce spiral windings of cumulative electrical actions. The article is developed, washed and dried and thereafter submitted to an etching which erases the conducting material only at places unprotected by the emulsion. After etching, a central soldering point provides electrical connection of conducting spirals 1 and 2 through the dielectric which is then burned off at this point. Obviously instead of photo-etching, any other method of forming such a spiral winding on a flexible dielectric sheet may be used. Further separate insulated coils may be made and then glued to the sheet, for instance by wrapping together in spiraled shape conducting and dielectric foils or by wrapping together spiral-shaped conducting foil of metallic material the surface of which has been oxidized, the oxide being insulating.

Figure 1:
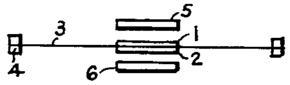
FIGS. 1 and 2 show, in side and top views, respectively, a simple form of executing the invention.
Figure 4:
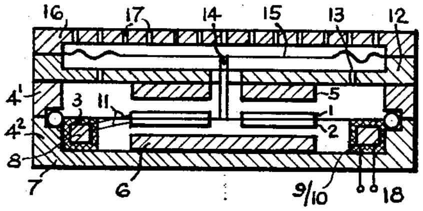
FIGS. 4 and 5 show, in side cross-sectional and in partially exploded views, respectively, a more elaborate form of a device according to the arrangement of FIGS. 1 and 2.
Figure 3:
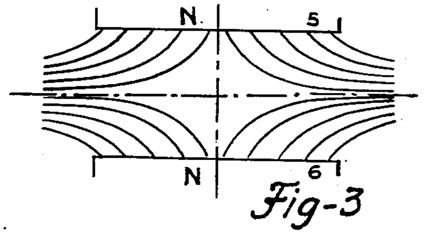
FIG. 3 illustrates graphically the lines of force of the permanent magnetic field in such an arrangement.

In the first embodiment of the invention, shown in FIGS. 1 and 4, a moving member of the type described is placed between two permanent cylindrical magnets 5 and 6 having identically magnetized pole pieces facing one another and defining an air-gap. Within this air-gap, the lines of force of the permanent magnetic field are substantially of the shape shown in FIG. 3, viz. substantially hyperbolical, at least including directions substantially parallel to the mid-plane of the air-gap and around its axis of rotation. The volume density of these lines of force rapidly decreases from the mid-plane to the polar faces of the magnets 5 and 6. When the spiral winding 1, 2 is displaced on opposite sides of the mid-plane, the variation of magnetic flux therethrough is quite important even for small vibratory amplitudes of the membrane, resulting in a high efficiency factor.

Figure 5:
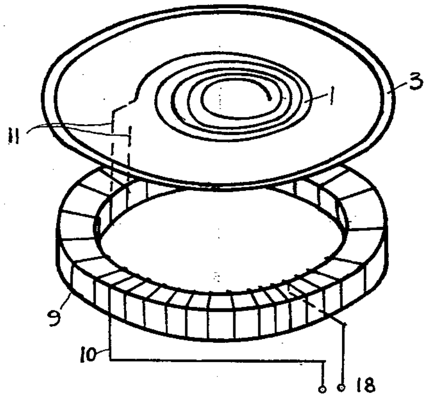

In view of this efficiency, it is of advantage to keep the impedance of the spiral winding 1, 2 rather low. This condition, however, will generally not ensure an adequate matching with the impedance of the external wire circuit to which the device will be connected for its exploitation. Some kind of impedance transformer must be provided and, according to a further feature of the invention, this is done without increasing the dimensions of the device since the magnetic core of such a transformer is formed as a toroid arranged under a face of the flexible member 3 and coaxial therewith. Obviously this transformer may either have two separate primary and secondary windings or may comprise a single winding acting as an auto-transformer in the electrical circuit between the spiral winding 1, 2 and the output terminals 18, as apparent from FIG. 4. In FIG. 4, the magnetic core of the transformer is shown at 8 and provided with a winding 9/10 which may consist of two separate windings, as apparent from FIG. 5, a primary winding 9 serially connected to spiral winding 1, 2 through flexible wires 11, and a secondary winding 10 connected to output terminals 18. The impedance of winding 9 matches that of winding 1, 2, the impedance of winding 10 matches that appearing at 18 when the device is connected to a two-wire telephone circuit, not shown. Of course in actual practice it will be of advantage that both windings 9 and 10 uniformly cover the core 8.

Figure 2:
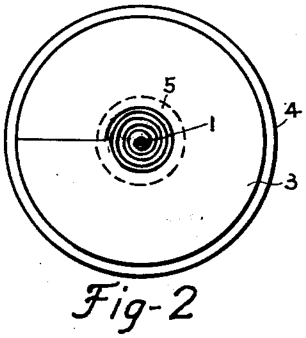

In the simple embodiment of FIGS. 1 and 2, the annular area of membrane 3 around magnets 5 and 6 must be made conveniently broad for efficient action of the acoustic pressure waves. This may lead to a diameter which may be estimated too wide per se. As shown in FIG. 4, in this case a relaying acoustical diaphragm may be provided for permitting a reduction of diameter. This diaphragm is shown at 15 and is rigidly linked to the membrane 3 by a short rod 14 passing through a duct axially extending through magnet 5. The spiral winding 1, 2 may then cover practically the complete area of the membrane and the diameter of magnets 5 and 6 may be enlarged to a diameter approaching the area of membrane 3.

FIG. 4 illustrates magnet 6 and the transformer 8—9/10 being supported on base plate 7 having a flange 4² and magnet 5 being supported by an intermediary plate 12 having a flange 4¹, clamping the periphery of membrane 3. The plate 12 may be provided with several apertures such as 13 to balance the pressure of the compression chamber between membrane 3 and diaphragm 15, the periphery of which is pinched between flanges of intermediary plate 12 and a covering plate 16 provided with a multiplicity of apertures such as 17 to drive the protected diaphragm 15. Any other structure of acoustical casing may be used without departing from the scope of this disclosure.

Without recourse to a relaying acoustical diaphragm, obviously several windings 1, 2 may be provided over a single membrane 3, symmetrically with respect to the axis of rotation of the structure, and as many air-gaps, and as many pairs of cylindrical magnets as there are spiral windings on the membrane. The several windings 1, 2 will be electrically connected in series relation provided the pole pieces of all magnets are of the same magnetic denomination.

For making the complete surface of membrane 3 acoustically efficient, however, it is preferred to have recourse to the second form of executing the invention shown with respect to FIGS. 6 and 7. The permanent magnets are toroids and magnetized along their axis of rotation. They are of identical dimensions and arranged for defining an annular air-gap and may extend to the peripheral fixation of the membrane 3. The graph of FIG. 8 shows that within the inner space of the magnet arrangement, the lines of force of the permanent magnetic field issuing from the annular air-gap extend substantially parallel to the mid-position plane of the air-gap until they become substantially hyperbolic around the axis of rotation of the structure. Consequently, when membrane 3 is activated, and spiral winding 1, 2 vibrates on opposite sides of this mid-position plane, an important variation of magnetic flux will be obtained therethrough.

In the simple form of casing shown in FIG. 6, the air-gap is defined by an insulated winding 9/10 on one of the toroidal magnets 26 and a mere wrapping 27 around the other one of these magnets 25. Actually the impedance matching transformer is constituted by one of the magnets and winding 9/10 coiled around it. This may be done because the directions of the permanent magnetic field from magnets 25 and 26 and of the variable magnetic field through the winding 9/10 are perpendicular to each other and, further, the intensity of the permanent field will be in any case much higher than that of the variable field. Consequently these fields will not react upon each other and no demagnetization of magnet 26 will occur in the operation of the device.

What is claimed is:

1. Electromagnetic device for sound powered telephones comprising in combination at least one pair of magnetic pole pieces of the same magnetic denomination facing each other and defining an air gap in which the field lines emerging from said pole pieces at center portions thereof extend in directions only substantially parallel to the plane of said air gap and at least one winding consisting of a flat spiral, means for supporting said winding movable in said air gap in a direction substantially perpendicular to its plane including a flexible dielectric membrane fixedly secured at its periphery and constituting the acoustical diaphragm of the device so as to transform in accordance with the movement of said winding within said gap the electrical energy of said winding into acoustical energy of said diaphragm and conversely.

2. Electromagnetic device for sound powered telephones comprising in combination at least one pair of permanent magnetic pole pieces of the same magnetic denomination facing each other and defining an air gap in which the field lines emerging from said pole pieces at center portions thereof extend in directions only substantially parallel to the plane of said air gap and at least one winding consisting of a flat spiral and a flexible dielectric membrane fixedly secured at its periphery and supporting said spiral winding movable in said air gap in a direction substantially perpendicular to its plane.

3. Electromagnetic device according to claim 2 wherein said supporting membrane also constitutes the acoustical diaphragm of the device.

4. Electromagnetic device according to claim 2 wherein said supporting membrane is driven at the center by a separate acoustical diaphragm.

5. Electromagnetic device according to claim 2 wherein said polar pieces are formed by separate permanent magnets of identical material and cross-section.

6. Electromagnetic device according to claim 5 wherein said permanent magnets are of cylindrical shape.

7. Electromagnetic device according to claim 5 wherein said permanent magnets are of toroidal shape and said spiral winding is supported coaxially therewith within the inner space defined by said toroidal magnets.

8. Electromagnetic device according to claim 2 comprising output terminals and an impedance matching transformer having an annular core coaxial with said membrane and at least one winding including a primary portion serially connected with said spiral winding and a secondary portion connected across said output terminals.

9. Electromagnetic device according to claim 8 wherein said primary and secondary portions consist of separate windings.

10. Electromagnetic device according to claim 7 comprising an impedance matching winding wound over at least one of said toroidal magnets, and a wrapping around the other of said magnets of substantially the same thickness as that of said insulated winding.

11. Electromagnetic device according to claim 10 comprising output terminals and separate primary and secondary windings wound over said toroidal magnet, the primary winding being serially connected with said spiral winding and the secondary winding being connected to said output terminals.

12. Electromagnetic device according to claim 10 wherein the periphery of the supporting membrane is clamped between the parallel annular portions of said magnets facing each other.

13. Electromagnetic device according to claim 6 wherein several spiral windings are formed at locations of said membrane in a position symmetrical around its axis of revolution and as many pairs of polar pieces are arranged as there are windings to cooperate said spiral windings, said windings being electrically interconnected.

References Cited in the file of this patent

UNITED STATES PATENTS

| | | |
|---|---|---|
| 1,034,200 | Carroll | July 30, 1912 |
| 1,238,439 | Rummler | Aug. 28, 1917 |
| 2,404,798 | Harry et al. | July 30, 1946 |
| 2,535,757 | Root | Dec. 26, 1950 |

FOREIGN PATENTS

| | | |
|---|---|---|
| 329,328 | Great Britain | May 13, 1930 |
| 134,225 | Austria | July 25, 1933 |
| 705,330 | Great Britain | Mar. 10, 1954 |